(12) United States Patent
Xiao (10) Patent No.: US 8,377,553 B2
(45) Date of Patent: Feb. 19, 2013

(54) CONSTRAINED LAYER DAMPER, AND RELATED METHODS

(75) Inventor: Hong Xiao, Farmington Hills, MI (US)

(73) Assignee: Material Sciences Corporation, Elk Grove Village, IL (US)

( * ) Notice: Subject to any disclaimer, the term of this patent is extended or adjusted under 35 U.S.C. 154(b) by 713 days.

(21) Appl. No.: 12/137,024

(22) Filed: Jun. 11, 2008

(65) Prior Publication Data

US 2009/0145541 A1    Jun. 11, 2009

Related U.S. Application Data

(60) Provisional application No. 60/992,420, filed on Dec. 5, 2007.

(51) Int. Cl.
*B32B 7/12* (2006.01)
*B29C 65/54* (2006.01)

(52) U.S. Cl. ............ 428/355 R; 428/343; 428/352; 428/344; 428/41.8; 156/249

(58) Field of Classification Search ........... 428/355 R, 428/343, 352, 356, 41.8, 344; 156/249
See application file for complete search history.

(56) References Cited

U.S. PATENT DOCUMENTS

| | | | |
|---|---|---|---|
| 3,160,549 A * | 12/1964 | Caldwell et al. | 428/317.3 |
| 4,508,774 A * | 4/1985 | Grabhoefer et al. | 428/220 |
| 5,213,879 A | 5/1993 | Niwa et al. | |
| 5,474,840 A | 12/1995 | Landin | |
| 5,691,037 A | 11/1997 | McCutcheon et al. | |
| 5,695,867 A | 12/1997 | Saitoh et al. | |
| 5,796,055 A | 8/1998 | Benson, Jr. et al. | |
| 5,858,521 A | 1/1999 | Okuda et al. | |
| 6,119,807 A | 9/2000 | Benson, Jr. et al. | |
| 6,536,555 B1 | 3/2003 | Kelsic et al. | |
| 6,790,520 B1 | 9/2004 | Todd et al. | |
| 2004/0214008 A1 | 10/2004 | Dobrusky et al. | |
| 2006/0006032 A1 | 1/2006 | Loth et al. | |

OTHER PUBLICATIONS

English Abstract of JP 54-043252, Sasaki et al., "Viscoelastic Blend for Vibration Damping Members", Apr. 5, 1979, 1 page.*
Viscoelasticity from Wikipedia, 1 page, [retrieved on Aug. 1, 2012]. Retrieved from the Internet: < URL: http://en.wikipedia.org/wiki/Viscoelasticity>.*
Advancements in Solventless Technology for Silicone PSAs, Alexander Knott, et al., Dow Corning, www.dowcorning.com/psi.

* cited by examiner

*Primary Examiner* — Hai Vo
(74) *Attorney, Agent, or Firm* — Berenato & White, LLC (57) ABSTRACT

A constrained layer damper having a multilayer damping material is provided, as are related methods for making and using the damper. The constrained layer damper features a constraining layer, a carrier layer, a release liner, a viscoelastic layer interposed between the constraining layer and a first surface of the carrier layer, and a silicone pressure-sensitive adhesive interposed between the release liner and a second surface of the carrier layer. The silicone pressure-sensitive adhesive has sufficient tackiness at room temperature to adhere the constrained layer damper, with the release liner removed, to a substrate, such as a metallic substrate. The constrained layer damper has a peak damping temperature value in a range of about 50° C. to about 100° C.

19 Claims, 4 Drawing Sheets

CONSTRAINED LAYER DAMPER, AND RELATED METHODS

CROSS-REFERENCE TO RELATED APPLICATION(S)

This application claims the benefit of priority of U.S. Provisional Application No. 60/992,420 filed Dec. 5, 2007, the complete disclosure of which is incorporated herein by reference.

FIELD OF THE INVENTION

This invention relates to constrained layer damper having a multilayer damping material, and to damped substrates and methods of making and using the dampers.

BACKGROUND OF THE INVENTION

Constrained layer dampers (CLDs) are known for their excellent damping characteristics and have found wide use throughout various industries. In the automotive industry, for example, constrained layer dampers are arranged about a vehicle passenger compartment for abating engine and outside noises and for deadening resonant vibrations experienced by the driver and passenger. The constrained layer dampers may be affixed to or incorporated into panels surrounding the passenger compartment. For example, the constrained layer dampers may be affixed to or incorporated into a vehicle dashboard and the wheel housing. Constrained layer dampers also may be placed in various panels, such as the door, roof, and floor about the passenger compartment.

The performance and effectiveness of the constrained layer dampers around the vehicle passenger compartment can greatly improve the tranquility of the driving experience by isolating the driver and other compartment occupants from outside disturbances. The quietness and smoothness are of significant value to many consumers, and are often considered by professional and consumer reviewers of the vehicle in grading the vehicle. Consequently, the constrained layer dampers may significantly influence the sales and profitability of a vehicle.

Applications for constrained layer dampers are not restricted to the automobile industry. Constrained layer dampers also are incorporated into industrial and residential machinery, business and computer equipment, household appliances, power tools, and other devices requiring noise and/or resonance vibration reduction. As with automobiles, the effectiveness of constrained layer dampers in each application strongly influences consumer enjoyment and sales.

Due to the relatively high temperature environments in which constrained layer dampers are often used, situations arise in which it is desirable for the CLDs to exhibit a peak damping temperature well in excess of room temperature. For example, heat generated by the engine of a vehicle or machinery may reach temperatures of about 80° C. to about 90° C., and even higher in some instances. While viscoelastic materials used in known constrained layer dampers may exhibit high peak damping temperatures such materials do not possess strong pressure sensitive adhesive characteristics at room temperature. As the result of poor pressure sensitive adhesive characteristics, fixedly securing the constrained layer damper to a substrate, such as an automobile part, may prove difficult or require expensive process equipment and procedures. The application operation by which the constrained layer damper is secured to the substrate often is performed in a heated environment, such as in an oven or a hot press. Such constrained layer dampers lack the versatility to be applied and adequately secured to a substrate in room temperature environments.

Viscoelastic layers made of silicone pressure sensitive adhesives can provide desired high temperature (e.g., about 80-90° C.) damping characteristics while also retaining room temperature pressure-sensitive adhesion characteristics. However, when applied to certain surfaces, such as a rough surface as often found on a cast aluminum engine cover, the silicone viscoelastic layer in a CLD must possess a relatively large thickness for proper bonding. Thin silicone layers may not wet out adequately, resulting in poor adhesion. On the other hand, increasing the thickness of a silicone viscoelastic layer can adversely affect the constrained layer damper performance by reducing peak damping temperature of the damper below the operating temperature experienced by the damper in use. Additionally, because silicone is relatively expensive compared to other damping materials, thick viscoelastic layers are economically undesirable.

SUMMARY OF THE INVENTION

A first aspect of the invention provides a constrained layer damper, featuring a constraining layer, a carrier layer having opposite first and second surfaces, a release liner, a viscoelastic layer interposed between the constraining layer and the first surface of the carrier layer, and a silicone pressure-sensitive adhesive interposed between the release liner and the second surface of the carrier layer. The silicone pressure-sensitive adhesive has sufficient tackiness at room temperature to adhere the damper, with the release liner removed, to a substrate, such as a metallic substrate or the like. The constrained layer damper has a peak damping temperature value in a range of about 50° C. to about 100° C.

According to a second aspect of the invention, a method of damping a substrate is provided. The method features removing a release liner from a constrained layer damper including a constraining layer, a carrier layer having opposite first and second surfaces, the release liner, a viscoelastic layer interposed between the constraining layer and the first surface of the carrier layer, and a silicone pressure-sensitive adhesive interposed between the release liner and the second surface of the carrier layer. The constrained layer damper possesses a peak damping temperature value in a range of about 50° C. to about 100° C. The pressure-sensitive adhesive of the constrained layer damper having its release liner removed is adhered to a substrate.

According to a third aspect of the invention, a method is provided of making a constrained layer damper having a multilayer damping material capable of adhering to a substrate, such as a metallic substrate.

Additional aspects of the invention, including devices, apparatus, articles, and methods, will become apparent upon viewing the accompanying drawings and reading the detailed description below.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiment(s) and method(s) given below, serve to explain the principles of the invention. In such drawings.

DETAILED DESCRIPTION OF EXEMPLARY EMBODIMENT(S) AND EXEMPLARY METHOD(S)

Reference will now be made in detail to exemplary embodiment(s) and method(s) of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the exemplary embodiments and methods.

Figure 1:
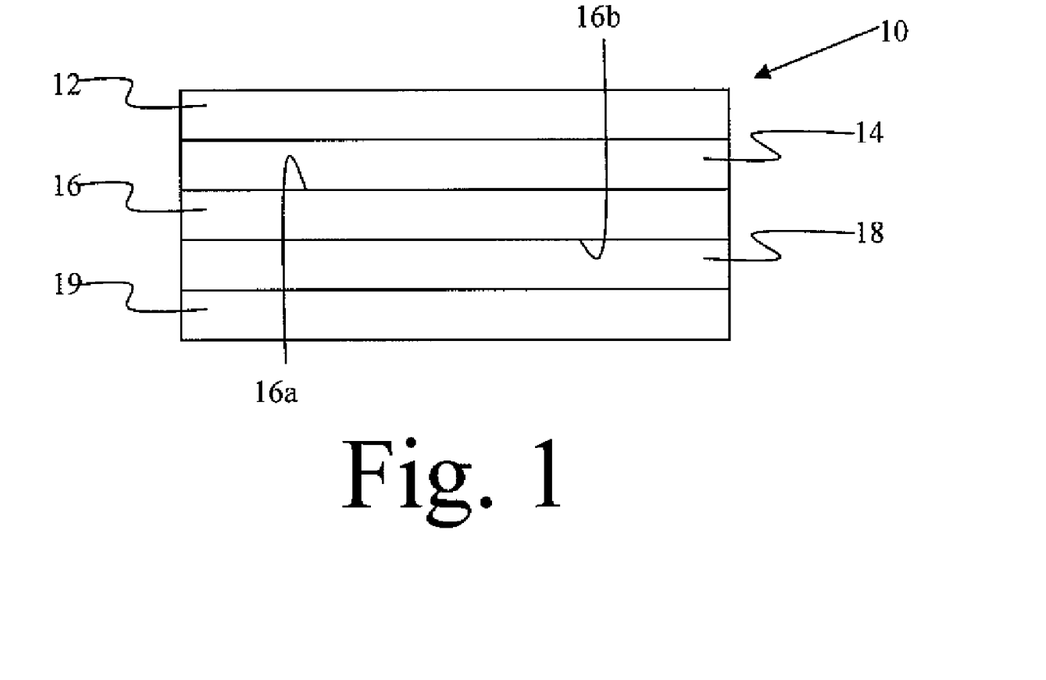
FIG. 1 is a schematic side view of a constrained layer damper according to an embodiment of the invention.

Referring now more particularly to the drawings, a constrained layer damper having a multilayer damping material according to an exemplary embodiment of the invention is generally designated by reference numeral 10 in FIG. 1. Constrained layer damper 10 includes a constraining layer 12, a carrier layer 16 having opposite first and second surfaces 16a, 16b, a release liner 19, a viscoelastic layer 14 interposed between constraining layer 12 and first surface 16a of carrier layer 16, and a pressure-sensitive adhesive 18 interposed between release liner 19 and second surface 16b of carrier layer 16. It should be understood that constrained layer damper 10 may include additional layers not shown in the drawings. For example, constrained layer damper 10 may possess multiple constraining layers 12, viscoelastic layers 14, carrier layers 16, pressure-sensitive adhesive layers 18, and/or release liners 19. Constrained layer damper 10 may contain layers having different functions and/or properties than those described below and illustrated in FIG. 1.

Figure 2:
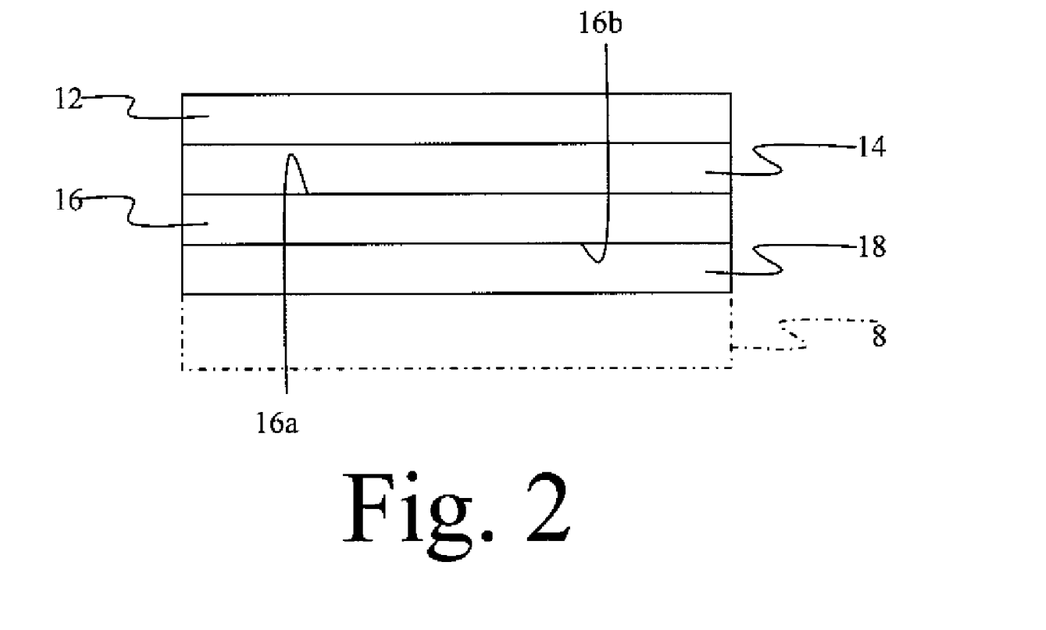
FIG. 2 is a schematic side view of a constrained layer damper affixed to a substrate according to an embodiment of the invention.

Constrained layer damper 10 is shown in FIG. 2 affixed to a substrate 8 (shown in phantom) after removal of release liner 19. The substrate 8 may essentially any material, including metals, metal alloys, ceramics, composites, and plastics. Advantageously, the receiving surface of substrate 8 does not require pretreatment to form an excellent bond with pressure-sensitive adhesive layer 18 of damper 10.

In use, constrained layer damper 10 provides a peak damping temperature value in a range of about 50° C. to about 100° C., particularly about 70° C. to about 90° C., more particularly about 80° C. to about 90° C. for providing excellent damping properties at temperatures routinely experienced during operation of the substrate or in the substrate's operating environment, i.e., as affected by the substrate's associated device or apparatus.

As referred to herein, peak damping temperature value is the temperature corresponding to the maximum composite loss factor measured using the damping test of ASTM E756-04 Standard Test Method for Measuring Vibration-Damping Properties of Materials. Test procedures were performed with a 205 mm×40 mm×3.2 mm aluminum base bar, a 170 mm×40 mm constrained layer damper having a 0.25 mm thick cold roll steel constraining layer, a 0.025 mm thick viscoelastic layer, a 0.7 mm polymer carrier, and a 0.05 mm pressure-sensitive adhesive.

Constraining Layer

In FIG. 1, constraining layer 12 is shown as an outermost layer of constrained layer damper 10. Although constraining layer 12 is depicted as an outermost layer, damper 10 may further include one or more additional layers affixed to the outer surface of constraining layer, i.e., opposite viscoelastic layer 14. Additional layers on the outer surface of constraining layer 12 may serve functional and/or aesthetic purposes.

Constraining layer 12 and carrier layer 16 (discussed below) possess sufficient stiffness to induce deformation in shear of viscoelastic layer 14 in response to vibration-inducing events transmitted through substrate 8. The vibrational energy generated by an event is dissipated in viscoelastic layer 14 through shear deformation at the constraining layer/viscoelastic layer interface and the viscoelastic layer/carrier layer interface. In addition to contributing to the shear deformation of viscoelastic layer 14 and PSA layer 18, constraining layer 12 also serves as a substrate or base layer on which viscoelastic layer 14 may be deposited or formed.

Constraining layer 12 is composed of a high strength material or materials selected for the intended processing and use of constrained layer damper 10. Particularly in the automotive industry, constraining layers are often made of metal or metal alloy panels such as steel. Other materials having adequate stiffness may also be selected, such as, for example, high strength plastics and elastomers, especially plastics and elastomers reinforced with inorganic and/or organic fillers described below in connection with carrier layer 16. Constraining layer 12 may comprise a single layer or a plurality of layers laminated together. The thickness of constraining layer 12 is not particularly restricted, although the thickness should be sufficient for withstanding the stresses and conditions of processing and use. For example, the thickness of constraining layer 12 may be in a range of about 0.1 mm to about 2.0 mm.

Viscoelastic Layer

Viscoelastic layer 14 is interposed between constraining layer 12 and carrier layer 16. In the embodiment shown in FIG. 1, one surface of viscoelastic layer 14 is in direct contact with constraining layer 12 and an opposite surface of viscoelastic layer 14 is in direct contact with first surface 16a of carrier layer 16. It should be understood that other arrangements may be selected. For example, one or more layers (not shown) may separate viscoelastic layer 14 from constraining layer 12 and/or carrier layer 16. Viscoelastic layer 14 further may comprise a laminate containing two or more viscoelastic sheets made of the same or different materials.

Viscoelastic layer 14 may be formed by adhesively coating a solution on constraining layer 12. Roll coating technology is especially useful for application of the solution adhesive. The elevated temperatures experienced during processing causes removal of the solution solvent and heat activates the viscoelastic layer 14 formed on constraining layer 12. The resulting viscoelastic layer 14 is sufficiently tacky at the elevated temperatures experienced during processing to cause it to adhere to carrier layer 16, thereby establishing a lasting bond between constraining layer 12 and carrier layer 16. Examples of suitable viscoelastic materials include acrylic ester polymers, acrylic copolymers, polyurethanes, polyesters, phenolics, silicones, and rubber modified phenolics. A specific example is PCX9 acrylic solution adhesive made by Material Sciences Corporation (Solids 23-28%, viscosity 3000-5000 cps). The acrylic polymer has a glass transition temperature ($T_g$) of about 85° C.

It should be understood that viscoelastic layer 14 may contain additional ingredients, such as additives and fillers. The inorganic filler(s) may be selected to improve the damping and physical properties of viscoelastic layer 14. Suitable fillers include calcium carbonate, dolomite, limestone, clay, talc, silica, silicates, minerals, other fillers, and combinations thereof. The filler may be present as finely divided particles having a size of, for example, about 5 to about 300 microns. Other ingredients that may be added include lubricants, blowing agents, adhesion promoting agents, activators, and processing aids.

The thickness of viscoelastic layer 14 may be, for example, in a range of about 0.01 mm to about 0.25 mm.

Carrier Layer

Carrier layer 16 is situated between viscoelastic layer 14 and pressure-sensitive adhesive layer 18. Carrier layer 16 preferably remains relatively stiff and substantially non-viscous at temperatures experienced by or anticipated for substrate 8 during operation. The stiffness of carrier layer 16 is relatively high to create shear with respect to viscoelastic layer 14 and pressure-sensitive adhesive 18. Although not necessarily limited, carrier layer 16 may have a thickness of about 0.1 mm to about 2.0 mm.

In an exemplary embodiment carrier layer 16 contains an elastomeric polymer. Representative elastomers that may be used include polyisobutylene (PIB), thermoplastic elastomers (TPE), various rubbers, such as styrene-butadiene rubber and nitrile rubber, ethylene-propylene copolymer, EPDM terpolymer, and combinations thereof. The elastomer component of carrier layer 16 preferably facilitates wetting out of pressure-sensitive layer 18 to improve the overall bonding characteristics of pressure-sensitive layer 18 to substrate 8.

Various fillers may be added to carrier layer 16 to improve mechanical properties of carrier layer 16 and for any other desired purpose. Fillers which can be used include inorganic fillers, such as metal ferrite, barium sulfate, dolomite, calcium carbonate, silica, talc and mica. The filler content will differ depending on factors such as type of filler and desired mechanical properties. Normally, the filler is present in an amount of about 0 to about 1500 parts by weight, more particularly about 100 to about 900 parts by weight for each 100 parts by weight elastomer. Carrier layer 16 may contain additional additives, including, for example, softening agents such as plasticizers, and processing oils. The carrier layer 16 may possess a Shore A hardness of, for example, 50 to 100, more particularly 80 to 95. Generally, hardness may be adjusted by controlling such factors as filler content, filler particle size, filler type, oil content, and crosslinking.

A particularly useful carrier layer 16 is composed of about 88 to about 92 weight percent ferrite powder, about 7 to about 11 weight percent elastomer such as polyisobutylene (molecular weight $1.9\text{-}2.3 \times 10^6$), and optionally other materials such as described herein.

The elastomeric characteristic of carrier layer 16 also provides an excellent aid for a relatively thin silicone pressure-sensitive adhesive layer 18 to wet out, even on relatively rough substrate surfaces, to establish excellent bonding.

Pressure-Sensitive Adhesive Layer

Pressure-sensitive adhesive (PSA) layer 18 is shown in FIG. 1 with one surface in direct contact with carrier layer 16 and an opposite surface in direct contact with release liner 19. The thickness of PSA layer 18 may be in a range of, for example, about 0.01 mm to about 0.15 mm. It should be understood that other arrangements and thicknesses may be selected. For example, one or more layers (not shown) in addition to pressure-sensitive adhesive layer 18 may be interposed between carrier layer 16 and release liner 19. Further, pressure-sensitive layer 18 may comprise multiple PSA layers made of the same or different materials.

The pressure-sensitive adhesive selected for this exemplary embodiment is relatively tacky at room temperature. As a result, upon removal of release liner 19, the pressure-sensitive adhesive layer 18 is capable of being adhered directly to a non-tacky, non-adhesive surface of a substrate 8, such as a metal substrate surface, at room temperature. Excellent adherence between substrate 8 and pressure sensitive adhesive layer 18 is realized. Further, the pressure-sensitive adhesive layer 18 has great flexibility and versatility for the application processes. Advantageously, the user can thus apply the constrained layer damper 10 to various substrates 8 without requiring special processing equipment (e.g., ovens).

Silicone pressure-sensitive adhesives are described in U.S. Pat. No. 5,624,763, the disclosure of which is incorporated herein by reference. The two main components of a silicone pressure-sensitive adhesive are (i) polydiorganosiloxanes, also referred to as silicone gums, typically having a number average molecular weight of about 5000 to about 10,000,000, more particularly about 50,000 to about 1,000,000 and (ii) copolymeric silicone resins, also referred to as MQ resins typically having a number average molecular weight of about 100 to about 1,000,000, more particularly, about 500 to about 50,000 comprising triorganosiloxy units and $SiO_{4/2}$ units. The silicone adhesives may comprise from about 20 to about 60 parts by weight silicone gum, and about 40 to about 80 parts by weight MQ resins. It is beneficial to the adhesive properties of the silicone pressure sensitive adhesive to also provide a chemical means of reacting the copolymeric silicone resin with the polydiorganosiloxane. Condensation reaction chemistry and/or addition-cure chemistry may be employed.

The high-molecular weight polydiorganosiloxanes may comprise, for example, an alkyl siloxane gum (e.g., polydimethylsiloxane), a phenyl siloxane gum (e.g., polydiphenylsiloxane), and/or an alkyl phenyl siloxane gum (e.g., polydimethyldiphenylsiloxane). Siloxane-containing copolymers such as (polydimethyl siloxane)-(methylvinylsiloxane) copolymer also may be used.

Silicate tackifying resins useful in preparing the pressure-sensitive adhesives include those resins composed of M, D, T and/or Q structural units, as well as combinations thereof (the single letter codes being conventionally used to describe silicate resins). Particularly useful is an MQ resin, which is typically supplied as a dispersion in a hydrocarbon solvent. The MQ name entails a core of three-dimensional Q units ($Si_4O_2$) surrounded by a shell of M units ($Me_3SiO$). The resin may also contain a level of silanol functionality on the surface.

Silicone pressure-sensitive adhesives may be generated by blending the siloxane gum and tackifier in a hydrocarbon solvent. Representative solvents include toluene, xylene, naphthalene, ethyl benzene, others, and combinations thereof. Most silicone pressure-sensitive adhesives possess adhesive characteristics upon solvent removal. Heating may be continued at an elevated temperature, such as about 130° C. to about 300° C., to cause curatives of the system to enhance crosslinking. Peroxides (e.g., benzoyl peroxide) are particularly useful for producing a crosslinked network. Alternatively, the silicone PSA may be prepared without a solvent. Solvent and solventless techniques are described in A. Knott, Advancements in Solventless Technology for Silicone PSAs, the disclosure of which is incorporated herein by reference.

In exemplary embodiments, the silicone pressure sensitive adhesive is sufficiently tacky at room temperature to permit direct bonding or sticking of the multilayer damper to a surface of an object to be damped. In addition to this adhesive characteristic, the silicone pressure sensitive adhesive simultaneously exhibits excellent damping at elevated temperatures, such as about 70° C. to about 90° C. Unlike silicone pressure sensitive adhesives, other types of pressure sensitive adhesives known in the art have glass transition temperatures around or below room temperature, and thus provide peak damping around or below room temperature. In order to raise the peak damping temperatures of these other types of known pressure sensitive adhesives, reactive monomers and oligomers of higher $T_g$ are added, and heating is carried to induce reaction and produce a higher peak damping temperature polymer.

Advantageously, the silicone pressure sensitive adhesive is sufficiently tacky for direct application to substrates and possesses high temperature damping characteristics without requiring further baking. Consequently, the object or substrate to be damped does not need to be subject to heating or baking with the silicone pressure sensitive adhesive.

An exemplary formulation for a pressure-sensitive adhesive formation is set forth in the table below:

TABLE 1

| Ingredient | Formulation (wt %) |
| --- | --- |
| Methyl silicone gum | 4.9 |
| Phenyl silicone gum | 10.7 |
| Methyl phenyl silicone gum | 1.5 |
| MQ resin | 29.7 |
| Toluene | 31.7 |
| VM&P Naphtha | 18.5 |
| Xylene | 2.1 |
| Benzoyl peroxide | 0.9 |

Release Liner

Release liner 19 may be selected from any known or suitable materials capable of releasing (e.g., peeling away) from pressure-sensitive adhesive layer 18. Examples of known release liners include paper materials and resin films, such as polyethylene, polypropylene, and polyesters.

Methods

Figure 3:
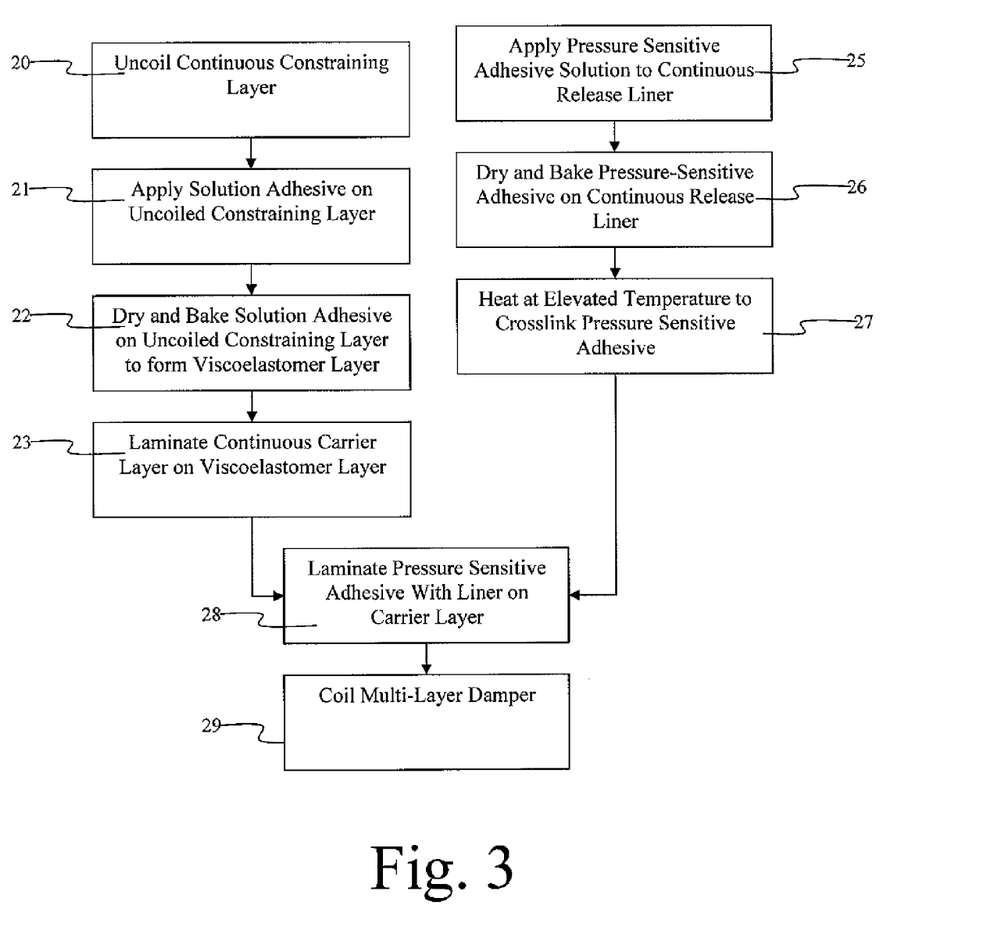
FIG. 3 represents a flow diagram depicting process steps for forming a constrained layer damper according to an embodied method of the invention.

A flow diagram depicting process steps for preparing constrained layer damper 10 according to an embodied method of the invention is depicted in FIG. 3. At step 20, continuous constraining layer 12 (coiled around a spool for facilitating transportation and storage) is uncoiled for continuous processing. At step 21 a solution adhesive is roll coated on uncoiled continuous constraining layer 12. The applied adhesive is dried and baked at 22 to establish a viscoelastic layer 14 adhered on constraining layer 12. Carrier layer 16 is laminated at step 23 onto an exposed surface of viscoelastic layer 14 while viscoelastic layer 14 is still hot and tacky.

Separately, at step 25 a formulation such as disclosed in Table 1 for making pressure-sensitive adhesive 18 is applied to a continuous release liner 19 and heated at step 26 in a range of about 60° C. to about 90° C. to remove the solvent. The heating temperature is then elevated at step 27 to, for example, about 130° C. to about 200° C. to crosslink the adhesive. Peroxides such as benzoyl peroxide are exemplary crosslinkers.

At step 28, pressure-sensitive layer 18 with its release liner 19 backing is applied against an available surface of carrier layer 16, and pressure may be applied, e.g., using nip rollers.

The resulting constrained layer damper 10 may be coiled at step 29 for transportation and later use.

It should be understood that the steps of the above-described method of preparing a constrained layer damper may be practiced in a different sequence than illustrated in FIG. 3. It should further be understood that the method may be modified to include alternative, additional or fewer steps than illustrated. For example, a continuous preformed viscoelastic sheet, rather than a solution adhesive as described above, may be fed into the process. In this alternative embodiment, the pre-formed viscoelastic sheet is film laminated or otherwise applied on uncoiled continuous constraining layer 12. Because the pre-form viscoelastic sheet is not self-adhesive at room temperature, elevated temperature may be used to affix the pre-form viscoelastic sheet to constraining layer 12.

Applications

The constrained layer dampers embodied herein are particularly effective for applications in which metal constraining layers and metal substrates are employed. Specific examples of substrate-containing apparatus, assemblies, structures, and devices for which the constrained layer dampers of the present invention are particularly useful include vehicles, such as automobiles, planes, and maritime vessels; construction materials, such as interior and exterior metal wall panels; household appliances; industrial and commercial power tools; business and computer equipment; and others. The constrained layer dampers of exemplary embodiments of the present invention also find applicability for various non-metal apparatus, assemblies, structures, and devices, such as gypsum wall board, plywood, drywall, etc. In an automobile, for example, the materials embodied herein may be used in various panel sections, such as the door, roof, floor, hood, and other body sections.

Figure 4:
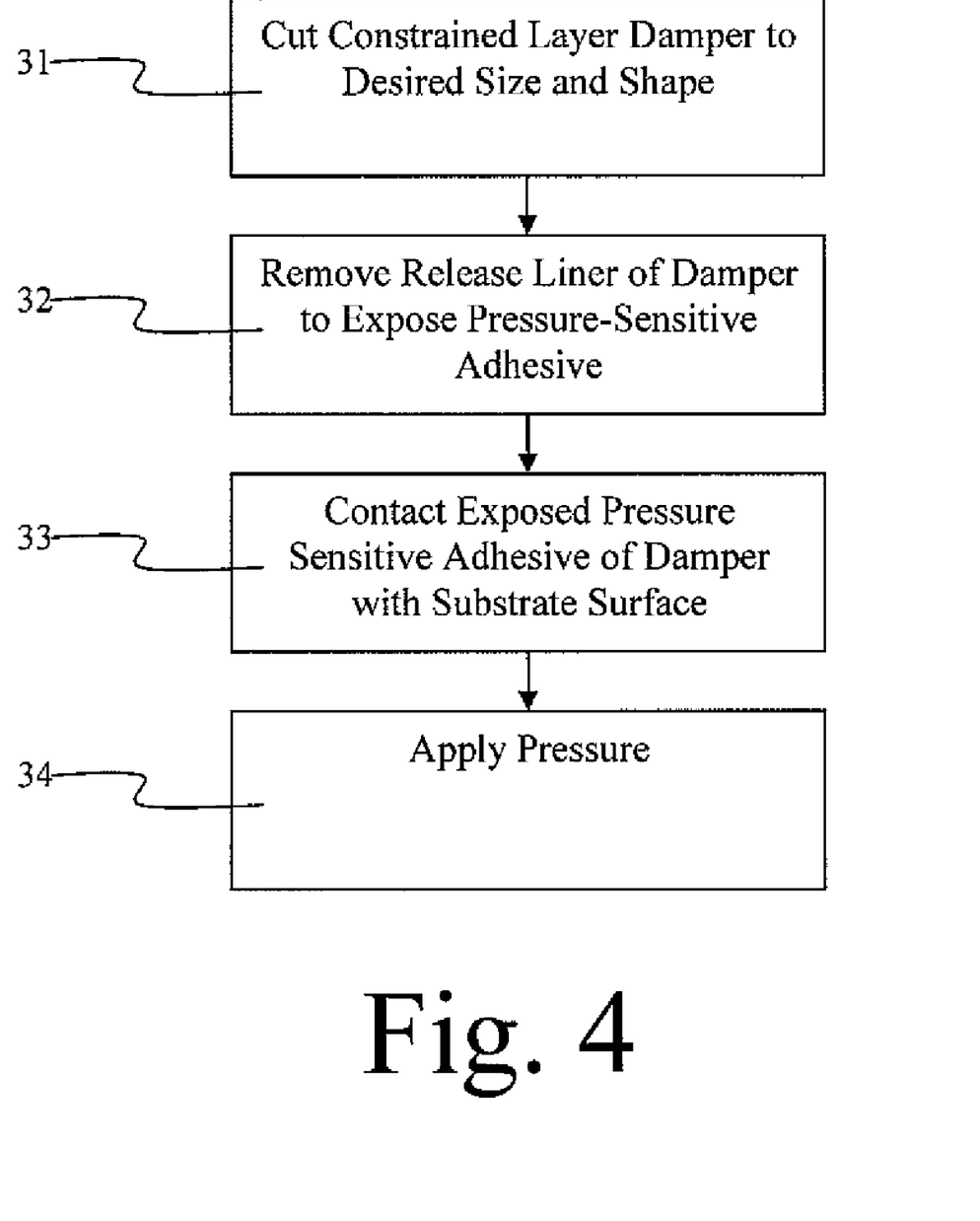
FIG. 4 represents a flow diagram depicting process steps for applying a constrained layer damper to a substrate according to another embodied method of the invention.

FIG. 4 is a flowchart showing an embodiment of a method for applying a constrained layer damper 10 to a structure to be damped. At step 31 constrained layer damper 10 is cut to a desired size and shaped to match substrate 8. Release liner 19 of damper 10 is removed to expose an available surface of pressure-sensitive adhesive 18, at step 32. Next, at step 33 the exposed surface of pressure-sensitive adhesive 18 is placed into contact with the surface of substrate 8. At step 34, damper 10 with release liner 19 having been removed is pressed against substrate 8 by hand or using, for example, rollers. Damper 10 preferably is sufficiently compliant conform to the curvatures of substrate 8.

It should be understood that the steps of the above-described method of applying a constrained layer damper may be practiced in a different sequence than illustrated in FIG. 4. It should further be understood that the method may be modified to include additional or fewer steps than illustrated.

The following examples serve to elucidate the principles and advantages of embodiments of the invention. The examples are presented by way of illustration, and are not to be considered exhaustive of the scope of the invention.

EXAMPLES

The damping loss factor of a constrained layer damper having the multilayer damping material set forth in Table 2 below was determined using the damping test of ASTM E756-04 Standard Test Method for Measuring Vibration-Damping Properties of Materials. For evaluation procedures, the base bar was aluminum having dimensions of 205 mm×40 mm×3.2 mm. Tests were carried out in modes 2, 3, and 4.

TABLE 2

| Testing Layer | Material | Dimensions |
|---|---|---|
| base bar | aluminum | 205 mm × 40 mm × 3.2 mm (126 mil thickness) |
| constraining layer | cold roll steel | 170 mm × 40 mm × 0.635 mm (25 mil thickness) |
| viscoelastic layer | acrylic | 170 mm × 40 mm × 0.025 mm (1 mil thickness) |
| carrier layer | 88-92 wt % ferrite powder 7-11 wt % polyisobutylene (MW 1.9-2.3 × 10$^6$) | 170 mm × 40 mm × 0.76 mm (30 mil thickness) |
| PSA | See Table 1 | 170 mm × 40 mm × 0.051 mm (2 mil thickness) |

Figure 5:
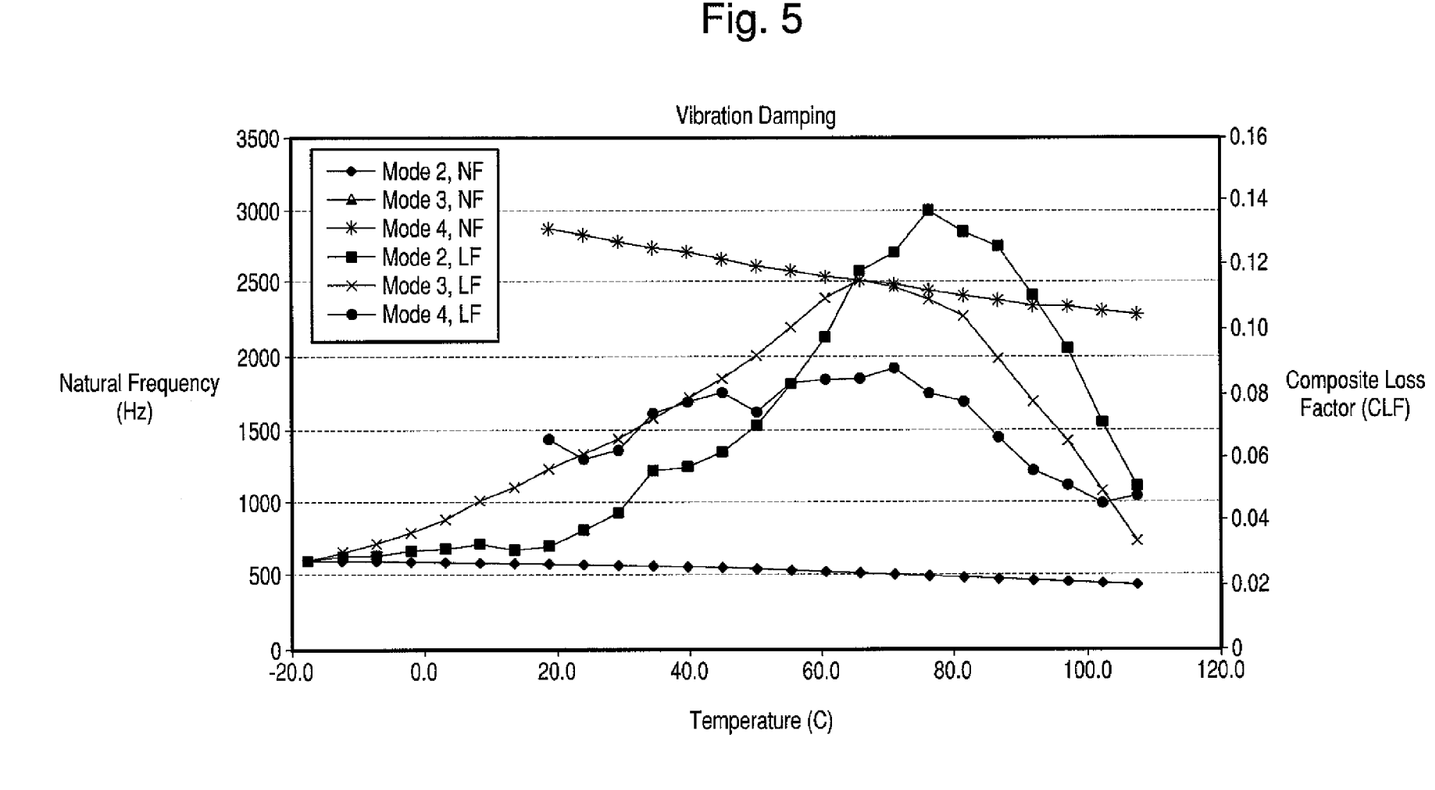
FIG. 5 is a chart graphing the natural frequency and composite loss factors at multiple temperatures for specimens prepared according to Example 1.

The test results are set forth in Table 3 below and illustrated in FIG. 5. The peak damping temperature value for modes 2, 3, and 4 each fell within a range of 50-100° C., more particularly about 70-90° C. Further, the constrained layer damper exhibited excellent adhesive properties at room temperature.

TABLE 3

| T/°F. | T/°C. | Mode 2, NF | Mode 2, LF | Mode 3, NF | Mode 3, LF | Mode 4, NF | Mode 4, LF |
|---|---|---|---|---|---|---|---|
| 0.2 | −17.7 | 598.5 | 0.027 | 1654.2 | 0.028 | | |
| 9.5 | −12.5 | 597.1 | 0.028 | 1640.4 | 0.029 | | |
| 19 | −7.2 | 593.4 | 0.028 | 1624.9 | 0.032 | | |
| 28.2 | −2.1 | 589.3 | 0.03 | 1608.3 | 0.036 | | |
| 37.7 | 3.2 | 584.5 | 0.031 | 1589.5 | 0.04 | | |
| 47.2 | 8.4 | 579.7 | 0.032 | 1570.4 | 0.046 | | |
| 56.6 | 13.7 | 575.1 | 0.03 | 1552.6 | 0.05 | | |
| 65.9 | 18.8 | 571 | 0.031 | 1532.9 | 0.056 | 2863.9 | 0.065 |
| 75.3 | 24.1 | 567.1 | 0.036 | 1512.5 | 0.061 | 2828.8 | 0.059 |
| 84.7 | 29.3 | 563.3 | 0.042 | 1490.6 | 0.066 | 2777.6 | 0.062 |
| 94.1 | 34.5 | 556 | 0.056 | 1469.2 | 0.073 | 2736.8 | 0.073 |
| 103.5 | 39.7 | 549.4 | 0.056 | 1447.3 | 0.08 | 2698.8 | 0.077 |
| 112.8 | 44.9 | 543.8 | 0.061 | 1426.2 | 0.084 | 2659.5 | 0.08 |
| 122.3 | 50.2 | 539 | 0.07 | 1405.4 | 0.092 | 2618.2 | 0.074 |
| 131.5 | 55.3 | 531.8 | 0.083 | 1380.5 | 0.1 | 2580.7 | 0.083 |
| 140.9 | 60.5 | 522.9 | 0.097 | 1355.6 | 0.109 | 2544 | 0.084 |
| 150.3 | 65.7 | 511.5 | 0.117 | 1332.8 | 0.111 | 2507.2 | 0.084 |
| 159.7 | 70.9 | 499.7 | 0.123 | 1308.4 | 0.114 | 2471.7 | 0.087 |
| 168.9 | 76.1 | 489.2 | 0.136 | 1284.6 | 0.109 | 2438.3 | 0.08 |
| 178.4 | 81.3 | 478.2 | 0.13 | 1262.9 | 0.104 | 2408.7 | 0.077 |
| 187.8 | 86.6 | 467.3 | 0.125 | 1243.6 | 0.091 | 2381.8 | 0.066 |
| 197.1 | 91.7 | 457.4 | 0.11 | 1228.1 | 0.078 | 2357.4 | 0.055 |
| 206.7 | 97.1 | 448.8 | 0.094 | 1212.8 | 0.065 | 2334.7 | 0.051 |
| 216 | 102.2 | 439.7 | 0.071 | 1197.7 | 0.049 | 2311.5 | 0.045 |
| 225.4 | 107.4 | 431.6 | 0.05 | 1181.1 | 0.033 | 2283.8 | 0.047 |

\* NF = Natural Frequency (Hz); LF = Composite Loss Factor

The foregoing detailed description of the certain exemplary embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims and their appropriate equivalents.

What is claimed is:

1. A constrained layer damper, comprising:
   a constraining layer;
   a carrier layer having opposite first and second surfaces, the carrier layer comprising metal ferrite filler and an elastomeric polymer in a weight ratio range of about 1:1 to about 9:1 of the metal ferrite filler relative to the elastomeric polymer;
   a removable release liner;
   a viscoelastic layer interposed between the constraining layer and the first surface of the carrier layer; and
   a silicone pressure-sensitive adhesive interposed between the release liner and the second surface of the carrier layer, the silicone pressure-sensitive adhesive possessing sufficient tackiness at room temperature to adhere the constrained layer damper, with the release liner removed, to a substrate,
   the constrained layer damper having a peak damping temperature value in a range of about 50° C. to about 100° C.,
   wherein the carrier layer is non-viscous at the peak damping temperature, and
   wherein the metal ferrite filler comprises ferrite powder, and wherein the carrier layer comprises about 88 to about 92 weight percent of the ferrite powder and about 7 to about 11 weight percent of the elastomeric polymer.

2. The constrained layer damper of claim 1, wherein the constraining layer comprises steel.

3. The constrained layer damper of claim 1, wherein the elastomeric polymer comprises polyisobutylene.

4. The constrained layer damper of claim 1, wherein the viscoelastic layer comprises a member selected from the group consisting of an acrylic ester polymer, an acrylic copolymer, a polyurethane, a polyester, a phenolic, a silicone, and a rubber modified phenolic.

5. The constrained layer damper of claim 1, wherein the viscoelastic layer comprises an acrylic polymer.

6. The constrained layer damper of claim 1, wherein the silicone pressure-sensitive adhesive is prepared from a formulation comprising a linear siloxane gum and a silicate tackifying resin.

7. The constrained layer damper of claim 6, wherein the linear siloxane gum comprises an alkyl siloxane, a phenyl siloxane, and an alkyl phenyl siloxane.

8. The constrained layer damper of claim 6, wherein the silicate tackifying resin comprises an MQ resin.

9. The constrained layer damper of claim 1, wherein the peak damping temperature value of the constrained layer damper is in a range of about 70° C. to about 90° C.

10. The constrained layer damper of claim 1, wherein:
    the constraining layer principally comprises a member selected from the group consisting of aluminum and steel; and
    the silicone pressure-sensitive adhesive is formulated from a composition comprising an alkyl siloxane, a phenyl siloxane, an alkyl phenyl siloxane, and an MQ resin.

11. The constrained layer damper of claim 10, wherein the peak damping temperature value of the constrained layer damper is in a range of about 70° C. to about 90° C.

12. A constrained layer damper, comprising:
    a constraining layer;
    a carrier layer having opposite first and second surfaces, the carrier layer comprising metal ferrite filler and an elastomeric polymer in a weight ratio range of about 1:1 to about 9:1 of the metal ferrite filler relative to the elastomeric polymer;
    a removable release liner;
    a viscoelastic layer interposed between the constraining layer and the first surface of the carrier layer, wherein a surface of the viscoelastic layer and the first surface of the carrier layer are in direct interfacing contact with one another; and a silicone pressure-sensitive adhesive interposed between the release liner and the second surface of the carrier layer, the silicone pressure-sensitive adhesive possessing sufficient tackiness at room temperature to adhere the constrained layer damper, with the release liner removed, to a substrate, the constrained layer damper having a peak damping temperature value in a range of about 50° C. to about 100° C., wherein the carrier layer is non-viscous at the peak damping temperature.

13. The constrained layer damper of claim 12, wherein the constraining layer comprises steel.

14. The constrained layer damper of claim 12, wherein the elastomeric polymer comprises polyisobutylene.

15. The constrained layer damper of claim 12, wherein the metal ferrite filler comprises ferrite powder, and wherein the carrier layer comprises about 88 to about 92 weight percent of the ferrite powder and about 7 to about 11 weight percent of the elastomeric polymer.

16. The constrained layer damper of claim 12, wherein the viscoelastic layer comprises a member selected from the group consisting of an acrylic ester polymer, an acrylic copolymer, a polyurethane, a polyester, a phenolic, a silicone, and a rubber modified phenolic.

17. The constrained layer damper of claim 12, wherein the peak damping temperature value of the constrained layer damper is in a range of about 70° C. to about 90° C.

18. A method of damping a substrate, comprising:

removing a release liner from a constrained layer damper comprising a constraining layer, a carrier layer having opposite first and second surfaces and comprising metal ferrite filler and an elastomeric polymer in a weight ratio range of about 1:1 to about 9:1 of the metal ferrite filler relative to the elastomeric polymer, the release liner, a viscoelastic layer interposed between the constraining layer and the first surface of the carrier layer, and a silicone pressure-sensitive adhesive interposed between the release liner and the second surface of the carrier layer, wherein the silicone pressure-sensitive adhesive possesses sufficient tackiness at room temperature to adhere the constrained layer damper, with the release liner removed, to the substrate, wherein the constrained layer damper has a peak damping temperature value in a range of about 50° C. to about 100° C., wherein the carrier layer is non-viscous at the peak damping temperature, wherein the metal ferrite filler comprises ferrite powder, and wherein the carrier layer comprises about 88 to about 92 weight percent of the ferrite powder and about 7 to about 11 weight percent of the elastomeric polymer; and adhering the pressure-sensitive adhesive of the constrained layer damper to the substrate.

19. The method of claim 18, wherein the substrate is metallic.

* * * * *